United States Patent [19]
Williams

[11] Patent Number: 4,865,101
[45] Date of Patent: Sep. 12, 1989

[54] RADIAL PLY TIRE

[75] Inventor: Arthur R. Williams, Solihull, England

[73] Assignee: SP Tyres UK Limited, Birmingham, England

[21] Appl. No.: 834,355

[22] Filed: Feb. 28, 1986

[30] Foreign Application Priority Data

Mar. 25, 1985 [GB] United Kingdom ............... 8505415

[51] Int. Cl.$^4$ ..................... B60C 11/03; B60C 9/18
[52] U.S. Cl. ................... 152/526; 152/209 R; 152/538
[58] Field of Search ............. 152/526, 528, 535, 210, 152/530, 534, 538, 559, 560, 523, 454, 539, 543, 546, 533; D12/137; 40/587; 29/407, 159.1

[56] References Cited

U.S. PATENT DOCUMENTS

| D. 60,343 | 2/1922 | Heater | D12/137 |
|---|---|---|---|
| D. 157,693 | 3/1950 | Long | D12/137 |
| 3,467,161 | 9/1969 | Menell et al. | 152/526 |
| 3,674,079 | 7/1972 | Varner | 152/526 |
| 3,909,906 | 10/1975 | MacMillan | 29/407 |
| 3,980,118 | 9/1976 | Kinas | 152/209 R |
| 4,299,264 | 11/1981 | Williams | 152/209 R |

FOREIGN PATENT DOCUMENTS

| 102005 | 8/1983 | European Pat. Off. |
|---|---|---|
| 1198691 | 8/1965 | Fed. Rep. of Germany . |
| 2129580 | 12/1971 | Fed. Rep. of Germany . |
| 1473029 | 3/1967 | France . |
| 2376763 | 8/1978 | France . |
| 57-205203 | 12/1982 | Japan ................. 152/210 |
| 2084623 | 4/1982 | United Kingdom . |

OTHER PUBLICATIONS

Patent Abstracts of Japan vol. 8, No. 191 (M-322) (1628) 4, Sep. 1984, JP59-81203.

Primary Examiner—Raymond Hoch
Attorney, Agent, or Firm—Birch, Stewart, Kolasch & Birch

[57] ABSTRACT

A radial ply tire including a tread reinforcing breaker package comprising at least one ply of tire breaker fabric characterized in that the cords in both edge regions of the single radially outermost ply of the breaker package are inclined to the circumferential centerline of the breaker package at opposite acute angles so that the cords in said edge regions are in relative "V" shaped formation and the tire is marked by a directional marker pointing in the opposite direction of the "V" formation so that the tire may be fitted to a vehicle with the marker in the direction of rotation for a non-driven wheel and in the opposite direction for a driven wheel so that the greatest torque forces are applied to the breaker ply in the direction of the "V" formation.

The outermost ply may be side by side strips or cord laid in a "V" formation.

16 Claims, 3 Drawing Sheets

TREAD

TREAD

BREAKER

BREAKER

RADIAL PLY TIRE

This invention relates to radial ply tires and, in particular, but not exclusively, to heavy vehicle radial ply tires.

Conventional radial tires are reinforced in the tread region by a tread reinforcement or breaker package which comprises two or more plies of substantially weftless tire cord fabric laid with the cords at acute angles to the circumferential centerline and the cords of each successive ply to opposite sides of the centerline. The edges of the breaker plies are usually cut edges of the fabric which means that cut cord ends are positioned side-by-side along the breaker ply edge.

In most applications, the greatest forces are applied to the breaker edge in cornering and under braking, the latter being always in one direction of rotation. In drive axle use, however, particularly on heavy vehicles where substantial torque forces are applied for long periods to the tire, the greatest forces are predominantly in the opposite direction of rotation.

In both cases, tire failures occur because of breaker edge looseness. This defect comprises loss of adhesion between the cords or the filaments or strands of the cords and the rubber compound of the tire and also unravelling or untwisting of the filaments or strands. In addition, breaker edge looseness occurs due to crack propogation from cut steel cord ends; any loss of structural integrity at the breaker edge leads to looseness.

In small tires, breaker edge looseness is often avoided by wrapping a guard strip or ply around the ply edges, as taught in UK Patent Specification No. 1,125,159 and in other cases by folding the edges of the ply or plies so that the folded edge provides the breaker edge. Yet another approach is to fold each cord individually, such as UK Patent Specification Publication No 2084 623A. Such solutions are, however, difficult or in some cases impossible to produce, particularly with steel cord breaker fabrics of the large gauge used for steel breakered truck tires.

It is an object of the present invention to provide a tire construction which has improved breaker resistance to breaker edge looseness in service.

According to one aspect of the present invention, a radial ply tire is provided including a tread reinforcing breaker package, comprising at least one ply of tire breaker fabric wherein the cords in both edge regions of the single radially outermost ply of the breaker package are inclined to the circumferential centerline of the breaker package at opposite acute angles so that the cords in said edge regions are in relative "V" shaped formation and the tire is marked by a directional marker pointing in the opposite direction to the "V" formation so that the tire may be fitted to a vehicle with the marker in the direction of rotation for a non-driven wheel and in the opposite direction for a driven wheel so that the greatest torque forces are applied to the breaker ply in the direction of the "V" formation.

In the case of non-powered or non-driven wheels, the greatest applied torque force is one of braking torque and in that case the point of the "V" formation in the breaker ply enters the contact patch after the edge regions in forward motion of the vehicle so that when brake force is applied the torque is in the direction of the point of the "V" formation.

In the case of a drive axle tire, the tire is mounted in the opposite sense. It is considered that the effect of this special construction is to reduce the adverse forces applied to the outermost breaker ply edge regions and to decrease the compression forces there applied. This provides an improvement in tire resistance to breaker edge looseness.

The outermost breaker ply may be formed by two side-by-side strips of tire cord fabric, one with its cords to one side of the centerline and the other with its cords to the other side of the centerline. The strips may be in edge-to-edge abutment at the center of the breaker package or may have their axially inner edges spaced apart. Preferably, the edges of the outermost ply are substantially at the same axial spacing as the edges of the next inwards breaker ply.

The outermost breaker ply may alternatively be formed by a ply of fabric in which the cords across the width of the ply are each of "V" shaped configuration with a bend at the centreline of the breaker package. The cords may have cut edges or may have looped or folded edges such as are shown in UK Patent Specification No 2084 623 (specifically in FIG. 4). In this latter construction, the advantages of non-cut edges, together with the avoidance of compression forces due to the directional nature of the breaker ply and the choice of rotational direction combine to give still further improved resistance to breaker edge looseness.

Furthermore, the marking on the tire to indicate the direction of rotation may be an indicator sign, e.g. an arrow on the sidewall or on the tread of the tire. Preferably, however, the tyre tread pattern of the tire is a directional tread pattern having transversely extending grooves extending from the centreline of the tread pattern to either side of the tire in "V" shaped formation. The "V" shaped grooves may be used together with a center rib or a central line of tread blocks, and the "V" shaped formation may have constant angle grooves or variable angle grooves, the angles being with respect to the centerline of the tire. The "V" shaped pattern is preferably in the opposite direction to the breaker outermost ply formation.

Finally the tire may also have the non-woven tire fabric bead filler strip or strips (when utilized) fitted in a specially selected direction with the filler strip cords in both beads in a direction at an acute angle to the bead core reinforcement with the radially outer ends of the cords all circumferentially displaced from the radially inner ends in the opposite direction to the point of the "V" of the breaker fabric ply.

Further aspects of the present invention will be apparent from the following description, by way of example only of some embodiments in conjunction with the attached diagrammatic drawings in which.

Figure 1:
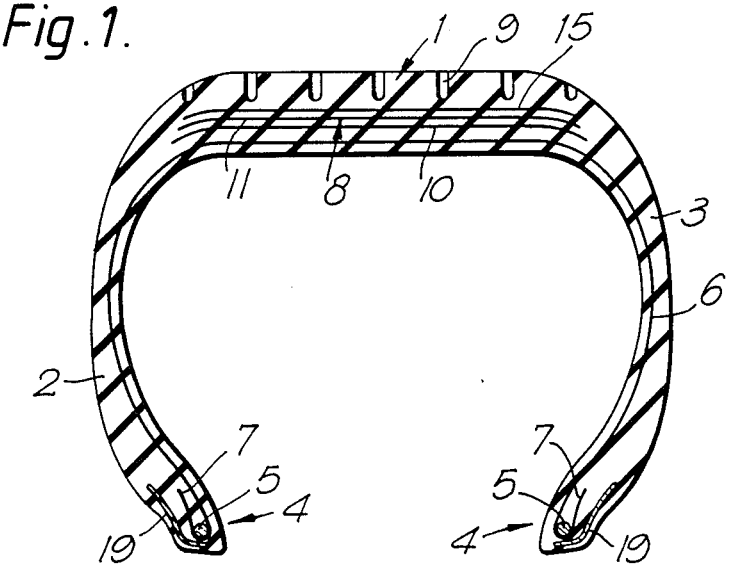
FIG. 1 is a cross section of tire according to the present invention.

The tire shown in FIG. 1 is a radial ply truck tire and comprises a tread region 1, two sidewalls 2 and 3 and at the radially inner edge of each sidewall a bead zone 4. Each bead zone 4 is reinforced by a bead hoop 5. The tire is reinforced by a carcass ply 6 of radially extending tire cords which is wrapped around each bead hoop 5 and has a small bead overlap 7 to anchor the ply. (The ply is shown as a single line but it may be two plies of material.) The tread region 1 is reinforced by a breaker package 8 which will now be described in more detail and the tread region has a pattern 9 formed in its ground engaging surface.

Figure 3:
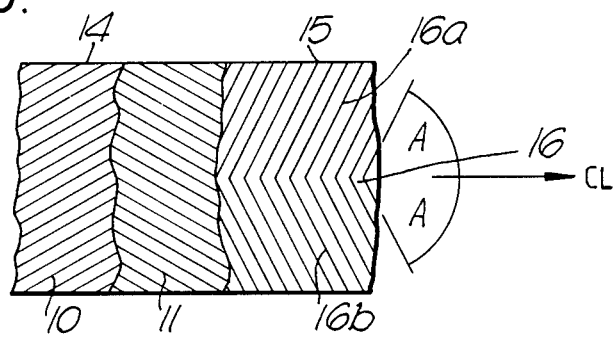
FIG. 3 is a scrap plan view from beneath FIG. 2 of one breaker package construction.

One breaker package 8 is shown in FIG. 3 and comprises two conventional breaker plies 10 and 11 each comprising sheets of steel tire cord cut at each edge 13 and 14 so that the cords are at an acute angle to the centerline of the CL breaker. The centerline CL extending circumferentially along a line in the direction of rotation of the tire and the movement of the vehicle. The cords and angles are conventional for both plies 10 and 11. A top breaker ply 15 is positioned over the plies 10 and 11 and this comprises a cut edge ply which is formed by steel cords 16 each of which is shaped in a "V" formation when viewed in plan as shown. Each cord 16 has one part 16a at an acute angle A and the part 16b at the other side of the centerline at an equal angle A to the other side of the centerline. This ply may be made by various methods including the most basic one of laying the cords around locating pins before rubbering the sheet with topping compound.

Figure 2:
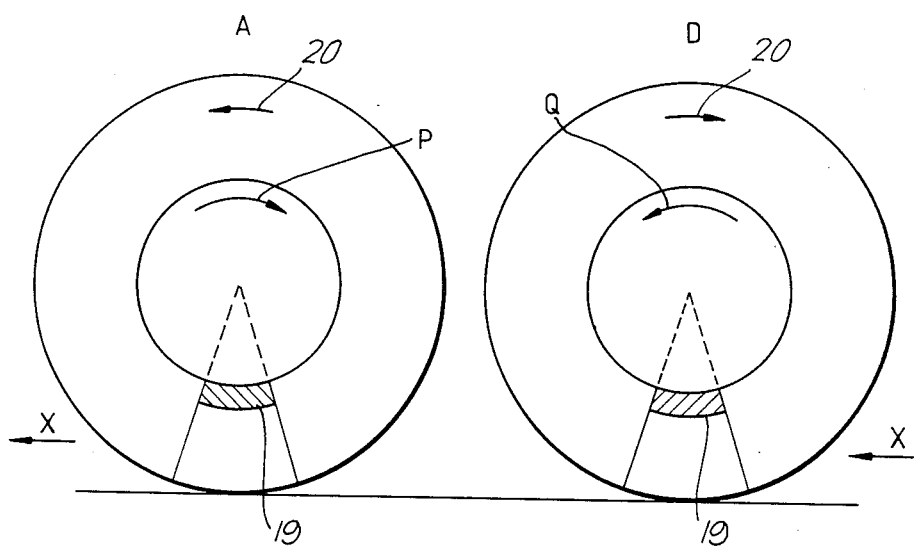
FIG. 2 shows the relationship of tread, breaker and filler strips for driven and non-driven wheels for the tire of FIG. 1.
Figure 2:
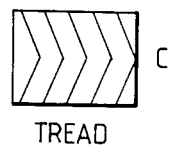
Figure 2:
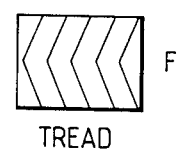
Figure 2:
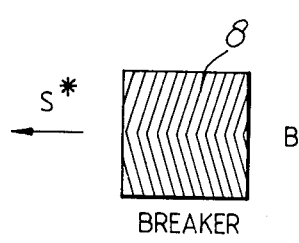
Figure 2:
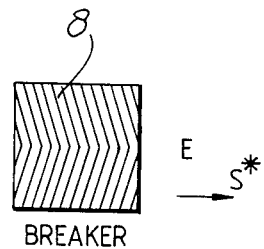

The breaker package 8 is assembled in the tire between the carcass reinforcement and the tread region 1 but with the direction of the "V" formation of the top breaker ply 15 noted and the tire is externally marked by a directional sidewall marking 20 (see FIG. 2) so that the direction of the marker 20 is opposite to the point of the "V" formation. FIG. 2 shows two tires A and D and in 2B and 2E their respective breaker directions which match the markers 20 on the tires in 2A and 2D.

The two tires shown are arranged for a front, i.e. non-driven wheel, and a rear, i.e. driven wheel, for a conventional truck moving in the forward direction shown by arrows X. Wheel A is the front non-driven wheel and wheel D is the rear driven wheel. The greatest torque force applied at the front wheel A is the torque of braking which is in the direction of arrow P and the dominant torque force applied at the driven rear wheel is the drive torque shown by arrow Q. The tires are fitted so that the arrow markers 20 are opposite in direction to the torque forces which for the non-driven axle means that the arrow on the top of the tire on non-driven axles points in the direction of movement of the vehicle X and only the drive axles have tires with the arrows at the top of the tire pointing rearwards of the vehicle. The direction of the radially outer breaker ply 15 are shown in FIGS. 2B and 2E for the tires as shown. Note these show the breaker directions in the ground contacting parts of the tires.

Figure 5:
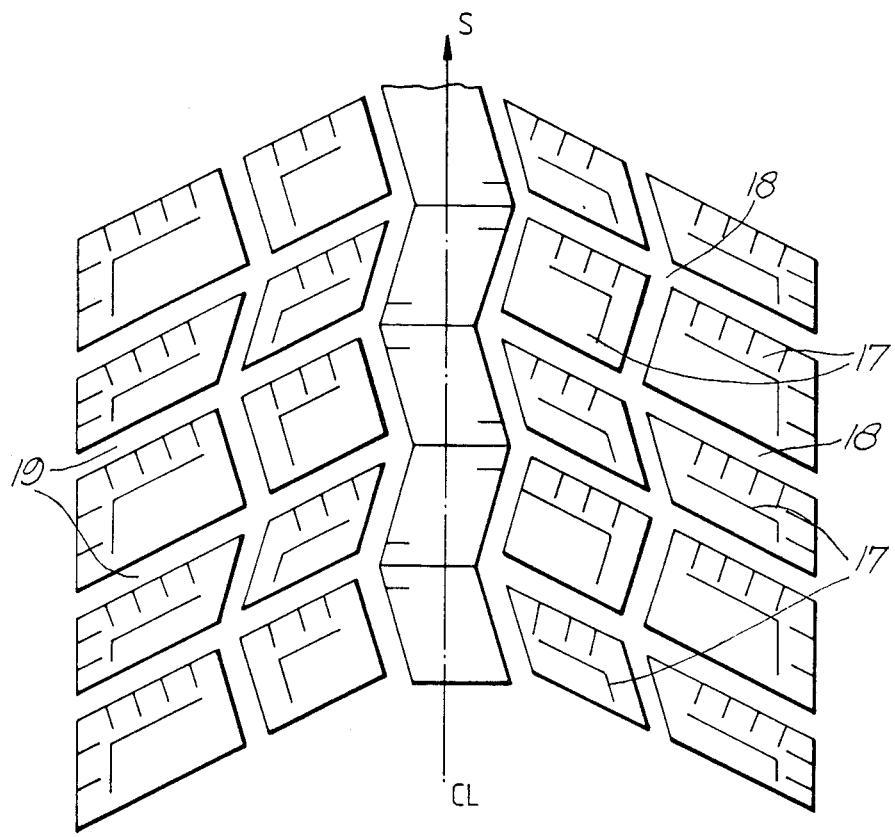
FIG. 5 is a plan view of part of one tread construction.

The tread pattern of the tire is shown in FIG. 5 and is a directional pattern in which tread blocks 17 are arranged at either side of the centerline of the tread to form two series of water carrying grooves 18, 19; one series to either side of the tire each of which extends at an acute angle to the centerline CL to give a "V" formation of grooves pointing in the direction of arrow S. The tread on the tire is always positioned as shown in FIGS. 2C and 2F so that the direction S of the tread is opposite to the direction of the breaker "V" (S* in FIG. 3). This means in fact that the tread direction is the same as the marker 20 and in fact the marker may instead comprise the directional tread pattern with the "V" of the pattern indicating the fitting direction.

Different tread patterns may be used including nondirectional types but directional patterns are preferred both from a tread grip point of view, particularly in wet conditions. This deformation causes inward forces to be applied to the breaker which is reinforcing the tread region.

The breaker of the present invention provides in both edges of the breaker, cords which extend inwardly of the tire and thus when the forces from the tread edges are applied to both breaker edges they both carry these forces into the breaker towards the point of the "V" formation. The resultant forces between adjacent cords are, for the greatest torque forces applied to the tires always compressive forces and this avoids the cord and separation which occurs when the cords point outwardly which they do at one side of all conventional breakers.

Figure 4:
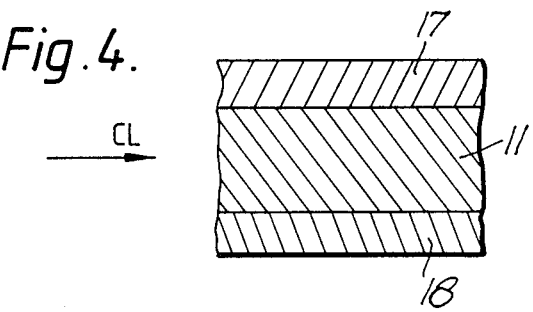
FIG. 4 is a scrap plan view from beneath FIG. 2 of another alternative breaker package construction.

An alternative breaker construction is shown in FIG. 4 where the second manual cut edge ply 11 has applied over its two edge strips 17 and 18. Both the edge strips are laid at opposite angles to the centerline of the breaker to provide at the bead edges the required "V" formation for the invention.

Another breaker ply construction uses two side strips which are each half the total breaker width and which are in edge-to-edge contact at the breaker centerline. Another breaker construction uses a single tire cord which zig zags back and forth across the ply with a bend at the center to give the "V" formation and 180° bends at each breaker edge to give a looped edge construction. Preferably the 180° loops are such that the cord filaments move into a vertical line so that all filaments have the same bend radius.

To further improve the durability of the tire the bead filler strips 19 (see FIG. 1) each comprise non-woven tire fabric strips laid with the cords at an acute angle to the centerline of the bead loop 5. Both strips 19 are laid with their cords inclined in the same direction such that the radially outer ends of all filler strip cords are circumferentially displaced from the radially inner ends in the opposite direction as the point of the breaker fabric which is the direction of the tire marker. This construction provides for the greatest torque force in both driven and non-driven applications to minimise strain and therefore avoid filler edge looseness.

Having now described my invention what I claim is:

1. A radial ply tire including a tread reinforcing breaker package comprising:
    at least one breaker ply of tire breaker fabric wherein the cords in both edge regions of the single radially outermost breaker ply of the breaker packages are inclined to the circumferential centerline of the breaker package at opposite acute angles so that the cords in said edge regions are in relative V-shaped formation, and
    said tire being marked by a directional marker pointing in the opposite direction to said V-shaped formation so that the tire may be fitted to a vehicle with the marker in the direction of rotation for a non-driven wheel and in the opposite direction for a driven wheel so that the greatest torque forces are applied to the breaker ply in the direction of the V-shaped formation thereby reducing tire strain, wherein the marking on the tire is a directional tread pattern having transversely extending grooves extending from the centerline of the tread pattern to either side of the tire in a V-shaped formation.

2. A radial tire according to claim 1, wherein the outermost breaker ply is formed by two side-by-side strips of tire cord fabric, one with its cords to one side of the centerline and the other with its cords to the other side of the centerline.

3. A radial ply tire according to claim 1, wherein the outermost ply is formed by a ply of fabric in which the cords across the width of the ply are each of V-shaped formation with a bend at the centerline of the breaker package.

4. A radial ply tire according to claim 1, wherein the cords have cut edges at the outer edges of the radially outermost ply.

5. A radial ply tire according to claim 1, wherein the cords have folded edges at the outer edges of the radially outermost ply.

6. A radial ply tire according to claim 1, wherein the radially outermost ply is substantially the same width as the breaker ply beneath said outermost ply.

7. A radial ply tire according to claim 1, wherein the tire includes a non-woven tire fabric bead filler strip in which the filler strip cords in both beads are laid in a direction at an acute angle to the bead core reinforcement with the radially outer ends of the cords all circumferentially displaced from the radially inner ends in the opposite direction to the point of the V-shaped formation of the breaker fabric ply.

8. A radial ply tire containing a tread reinforcing breaker package including at least one breaker ply of the tread reinforcing breaker package comprising:
    a radially outermost first breaker ply formed of tire breaker fabric wherein the cords of said tire breaker fabric extend from the circumferential centerline of said tire to the peripheral edges of the tire at an acute angle, forming a V-shaped formation, whereby the torque forces applied to the breaker ply during rotation of the tire are concentrated in the direction of said V-shaped formation, and
    said radial ply tires having a directional marker formed thereon, wherein said directional marker points in the opposite direction to said V-shaped formation so that said tire is fitted to a vehicle with said directional marker pointing in the direction of rotation for a non-driven tire and in the opposite direction for a driven tire, and wherein said directional marker is a directional tread pattern having transversely extending grooves extending from the centerline of the tread pattern to either side of the tire in a V-shaped pattern.

9. A radial ply tire according to claim 8, wherein the ply of said tread reinforcing breaker package having the V-shaped formation is the outermost ply.

10. A radial ply tire according to claim 9, wherein said tread reinforcing breaker package includes at least a second breaker ply disposed radially inside said first breaker ply.

11. A radial ply tire according to claim 10, wherein said tread reinforcing breaker package includes a third breaker ply disposed radially inside said second breaker ply.

12. A radial ply tire according to claim 11, wherein said second breaker ply is formed of tire breaker fabric having parallel cords which extend at a first acute angle from the circumferential centerline of said tire, and said third breaker ply is formed of tire breaker fabric having parallel cords which extend at a second acute angle from the circumferential centerline of said tire opposite to said first acute angle.

13. A radial ply tire according to claim 12, wherein said second breaker ply further comprises first and second edge strips of tire breaker fabric having parallel cords one disposed on each of the outer edges of said second breaker ply, wherein the cords of said edge strips extend at first and second acute angles from the circumferential centerline of said tire.

14. A radial ply tire according to claim 12, wherein said first breaker ply comprises two adjacent side strips having edge-to-edge contact at the circumferential centerline of said tire.

15. A radial ply tire according to claim 11, wherein said V-shaped formation of said first breaker ply is formed by a single cord which zig zags back and forth across said first breaker ply so as to have 180° bends at the outer edges of said first breaker ply thereby forming a looped edge construction.

16. A radial ply tire according to claim 12, wherein said V-shaped formation of said first breaker ply is formed by a single cord which zig zags back and forth across said first breaker ply so as to have 180° bends at the outer edges of said first breaker ply thereby forming a looped edge construction.

* * * * *